Sept. 24, 1974     C. M. YARNILSKY     3,838,032

COMPENSATED POLAROGRAPH

Filed March 24, 1972

Chaim Yarnitzky, INVENTOR

BY

Bierman & Bierman ATTORNEY

Sept. 24, 1974　　　　　　　C. M. YARNILSKY　　　　3,838,032
　　　　　　　　　　　COMPENSATED POLAROGRAPH
Filed March 24, 1972
　　　　　　　　　　　　　　　　　　　3 Sheets-Sheet 2

Chaim Yarnitzky, INVENTOR

BY

Berman & Berman ATTORNEY 3,838,032
COMPENSATED POLAROGRAPH
Chaim M. Yarnilsky, Haifa, Israel, assignor to Technion Research and Development Foundation Limited
Continuation-in-part of application Ser. No. 222,512, Feb. 1, 1972, which is a continuation of application Ser. No. 28,778, Apr. 15, 1970, both now abandoned. This application Mar. 24, 1972, Ser. No. 237,804
Int. Cl. G01n 27/48
U.S. Cl. 204—195 R          12 Claims

ABSTRACT OF THE DISCLOSURE

A system for direct current polarographic analysis, an electrochemical technique used in analytical chemistry, includes a cell which contains the liquid to be analyzed. A reference (standard) electrode and a working (indicator) electrode in the cell are connected in an electronic circuit. The current-resistance potential drop across the cell is compensated by the circuit, which circuit includes integrative means and an electronic switch. The comparative closure time of the switch is determined by the cell resistance, which resistance, after integration, affects the voltage-sensitive gates of the electronic switch.

---

This application is a continuation-in-part of application Ser. No. 222,512 filed Feb. 1, 1972, which, in turn, is a continuation of Application Ser. No. 28,778 filed Apr. 15, 1970, both now abandoned.

The present invention relates to chemical analysis and more particularly to electrochemical polarographic analysis.

Polarographic analysis is an electrochemical technique used in analytical chemistry. It is a voltametric technique, that is, it involves observation of current-potential-time relationships at electrodes immersed in electrolytic solutions. Polarographic analyis s is applicable to any ionic or molecular species that is oxidizable or reducible in electrolysis within certain limits of potential. Polarographic analysis has been used for the determination of most metals, including those as active as sodium and potassium, and for the determination of various organic functional groups including aldehydes, ketones, halogens, double and triple bonds, nitro, azo, hydrazo amino, sulfides and mercaptans.

In general, the instruments used in polarographic analysis include a potentiometer for adjusting the potential, a galvanometer for measuring current, and a cell. The cell commonly contains two electrodes, a reference or standard electrode and a working or indicator electrode.

The current through the electrolysis cell is measured as a function of the applied potential. For example, at sufficiently anodic (oxidizing) potentials, no current is observed in the case of a reducible substance. As the potential becomes more cathodic, appreciable reduction occurs and the current rises. Ultimately, a potential is reached at which reduction occurs as rapidly as the ions or molecules can reach the electrode surface, i.e., the current levels off at a limiting value independent of further increases in potential. Generally the current-potential curve has a sigmoidal shape. The magnitude of the limiting current is proportional to the concentration of the reducible substance so the technique may be used in quantitative analysis. The half-wave potential is characteristic of the reacting material so that the technique is also useful in qualitative analysis. At the half-wave potential the current is midway between the residual current (current not attributable to the reducible material) and the limiting current. A polarogram can be plotted manually by varying the potential in finite increments and measuring the current at each. Alternatively, instruments are available in which the potential is scanned and the current recorded automatically.

The technique of polarographic analysis has had certain limitations. Ideally the potential drop between the bulk of the solution and the indicator electrode, with liquid in the cell, should be independent of the current. Any variation in that potential drop results in inaccuracy of the analysis or may make the analysis impossible. For example, variations in potential drop may make two electrode polarographic analysis impossible if the solution is organic or of low ionic strength.

In the past, two approaches have been utilized in solving the problem of maintaining a desired voltage across the analysis cell. One approach was to use three electrodes in the cell. However, the three electrode system has the disadvantage of unnecessary complications in routine work. Furthermore, the three electrode system does not provide sufficient compensation for the potential drop when the resistance of the analytical cell is primarily due to the relationship between the working (indicator) electrode and the solvent. The alternative approach is to use an electronic positive feedback circuit connected to the two electrodes. But such a system may be inconvenient and unstable.

It is the objective of the present invention to provide a system for direct current polarographic analysis in which, using two electrodes, the potential drop across the cell may be compensated.

In accordance with one aspect of the present invention, a two electrode polarographic analysis system is provided. The system includes a cell adapted to contain the liquid to be analyzed and having a reference (standard) electrode and a working (indicator) electrode.

The resistance across the cell is measured by applying an alternating potential (trapezoidal wave) to the cell and by an integrating sub-circuit, which sub-circuit includes an operational amplifier and a Zener diode for circuit limiting. The integrated output is connected to the voltage-sensitive input gates of an electronic switch. The relative closure time of the switch is consequently controlled by the alternating potential drop across the cell. When the resistance of the cell tends to increase, the electronic switch tends to be closed. The closure of the electronic switch, through a series of operational amplifiers, controls the amount of positive feedback which is fed to the reference electrode of the cell. The trapezoidal shaped wave is derived from a wave generator and an operational amplifier.

Although the present invention has been described in connection with a two-electrode cell for analytical purposes, it should be understood that the compensation circuit can be successfully used in a three-electrode cell, for example, in large scale electrochemical processes. In such a three-element cell the third or counter-electrode would be the current supply and a more accurate voltage difference to the working electrode may be obtained.

In large scale electrochemical processes, for preparative purposes, means for supplying working power to the third electrode is provided. Preferably, this comprises an operational amplifier and a current booster which elements may also be used for supplying the entire current to the system for carrying out the desired electrochemical reaction.

For the preparation of relatively small quantities of material, e.g. for laboratory purposes, a current booster having an output of the order of 1 amp. is generally sufficient, while for industrial uses, currents of 100 amps. and more are often required. Generally, regardless of the current level at the booster, circuit parameters will not have to be changed to handle the increased power delivered to the cell.

Other objectives of the present invention will be apparent from the following detailed description of the invention, giving the inventor's best mode of practicing the invention, the description being taken in conjunction with the accompanying drawing. In the drawing.

Figure 1:
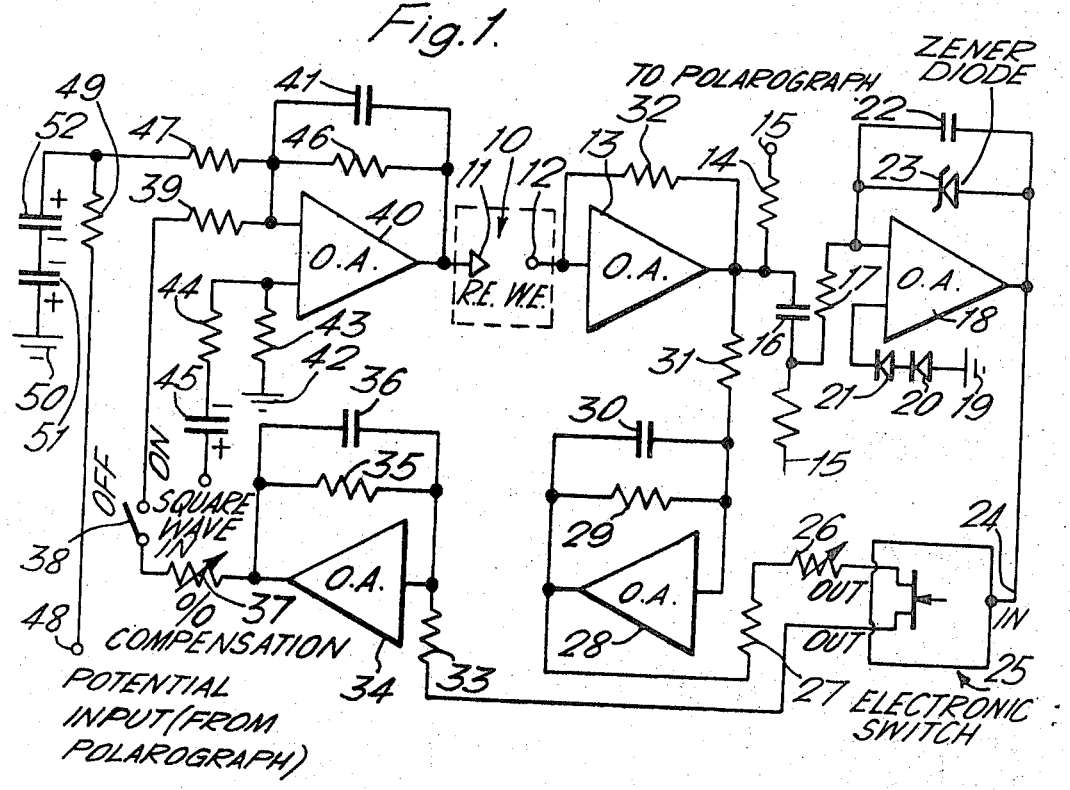
FIG. 1 is a circuit diagram of the circuit of the dynamic compensator of the present invention.

The electrochemical analytical cell 10, shown in dotted outline, has within it a reference (standard) electrode 11 and a working (indicator) electrode 12. The working electrode is connected to an operational amplifier 13 at its input. The output of the operational amplifier 13 is connected, through resistor 14 (of 200K ohms) to a terminal 15, which terminal is adapted to be connected to the polarograph. In addition, the output of the operational amplifier 13 is to a condenser 16 (of 0.22 microfarads) in series with a resistor 17 (of 10K ohms) to an input of a second operational amplifier 18. The second input of the operational amplifier 18 is from ground terminal 19 through diodes 20 and 21 in series and to $-15$ volts through a resistor 53 (of 50K ohms). A condenser 22 and a Zener diode 23 are provided, in parallel, across the input and output of the operational amplifier 18. The Zener diode is preferably selected so that its breakdown voltage is between 4.7 and 5.6 volts, so that it acts as a current limiter. The output of the operational amplifier 18 is to the input 24 of an electronic switch 25. A detailed drawing of a suitable circuit for the electronic switch is given in FIG. 2.

The output of the electronic switch 25 is a field effect transistor. One terminal of the field effect transistor is connected to the working electrode 12 by means of a subcircuit which includes an adjustable (25K ohm) resistor 26 in series with (20K ohm) resistor 27. Those resistors are connected to the output of an operational amplifier 28. The operational amplifier 28 acts as a filter as it is in parallel with a (100K ohm) resistor 29 and a (0.22 microfarad) condenser 30. The input to the operational amplifier 28 is across a resistor 31 in series with resistor 32, with resistor 32 being connected to the working electrode 12.

The other output of the electronic switch 25 is through a resistor 33 (510 ohms) and to the input of an operational amplifier 34. The operational amplifier 34 acts as a filter as it is in parallel with a (100K ohm) resistor 35 and a (0.22 microfarad) condenser 36. The output of the operational amplifier 34 is to an adjustable resistor 37 connected in series with a switch 38. The switch 38 is in series with (100K ohm) resistor 39 connected to an input of an operational amplifier 40. The switch 38 may be opened, by the operator, to halt the positive feedback. The operational amplifier 40 is in parallel with a (0.22 microfarad) condenser 41. The output of the operational amplifier 40 is to the reference electrode 11. The second input of the operational amplifier 40 has one connection to ground 42 across a (1K ohm) resistor 43. It is also connected across a (25K ohm) resistor 44 in series with a (10 microfarad) condenser 45 to the output of a square wave generator. The square wave generator is shown in detail in FIG. 3. The output of operational amplifier 40 is also connected to a resistor 46 (100K ohm) which is in series with resistor (10K ohm) 47. There are two leads to the resistor 47. The first is the potential input from the polarograph terminal 48, which is connected across a resistor 49 (90K ohm). The second lead is to ground 50 across two condensers (each of 50 microfarads) in series 51 and 52.

The dynamic resistance consists of the two resistors 26 and 27 in series with the output of the electronic switch 25. The resistor 26 is for calibration.

The actual resistance of the network will be $$R_s \frac{t}{\Delta t}$$

in which:

$R_s$ is the total resistance of the components, namely, $t$ is the total periodic time of the alternating voltage applied (the frequency of the square wave generator) and $\Delta t$ is the portion of time $t$ during which the electronic switch 25 is closed.

The $\Delta t$ is a function of the resistance of the cell and that resistance is communicated, after integration, to the voltage-sensitive gates of the electronic switch.

Figure 2:
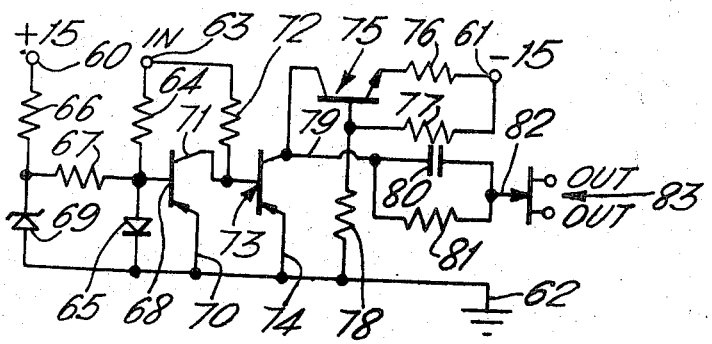
FIG. 2 is a circuit diagram of the electronic switch portion of the circuit of FIG. 1.

A suitable electronic switch circuit is shown in detail in FIG. 2. The switch has a positive voltage of 15 volts at terminal 60, negative 15 volts at terminal 61, and a ground terminal 62. The input terminal 63 is connected to a resistor 64 (36K ohm) in series with a diode 65 whose opposite terminal is connected to ground 62. The positive voltage from terminal 60 is connected through resistor 66 (of 10K ohms) and resistor 67 (of 62K ohms) to the base of transistor 68. A Zener diode 69 is positioned between the opposite terminal of resistor 67 and the ground 62. The emitter 70 of transistor 68 is connected to the ground 62 and its collector 71 is connected across a resistor 72 (of 10K ohms) to the input terminal 63. The collector 71 is also connected to the base of transistor 73 whose emitter 74 is connected to ground 62. The collector of transistor 73 is connected to the collector of transistor 75. The emitter of transistor 75 is connected across resistor 76 (of 10K ohms) to negative voltage terminal 61. The negative voltage terminal 61 is connected, through resistor 77, to the base of transistor 75, which base, through resistor 78, is connected to the ground 62. The collector 79 of transistor 73 is also connected through a parallel circuit consisting of condenser 80 and resistor 81 to the gate 82 of the field effect transistor 83.

The electronic switch 25 is sensitive to two voltage points, for example, at 0 volts and at 4.6 volts. If the voltage is between those points, the switch is closed. If the voltage is below 0 volts or above 4.6 volts the switch is open. Its impedance is high (for example 20 Megohms) when open, and low (for example 200 ohms) when closed. The comparative rate, how long the switch is open compared to how long it is closed, depends upon the input. The input voltage to the electronic switch 25 is a function of the material within the cell 10.

The field effect transistor 83 is a solid state electronic device having a high input impedance. It is a unipolar device whose operation is primarily a function of the charge carrier of holes in a p-channel device and electrons in an n-channel device. The gate is its control electrode (analogous in function to the base of a regular transistor) and the two ohmic contacts are the source and the drain. Conduction between the source and the drain is controlled by the charge on the gate.

Figure 3:
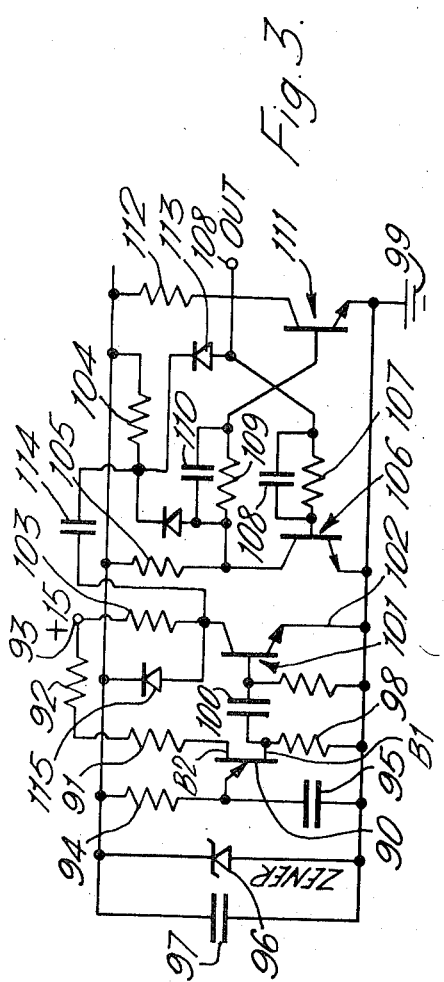
FIG. 3 is a circuit diagram of the square wave generator portion of the circuit of FIG. 1.

A suitable wave generator is shown in detail in the circuit of FIG. 3. It is understood, however, that other wave generators may be used as such circuits are generally known in the art. The wave generator of FIG. 3 has a unijunction transistor (U.J.T.) 90 whose base 2 B2 is connected through resistors 91 and 92 to the treminal 93 of $+15$ volts. The emitter of U.J.T. transistor 90 is connected between a resistor 94 and a condenser 95. Voltage stabilization is provided by a Zener diode 96 in parallel with the last-mentioned condenser and resistor, which Zener diode is preferably chosen to be at a voltage of 6.2 volts. The Zener diode 96 is also parallel with a condenser 97. The base 1 B1 of U.J.T. transistor 90 is connected to resistor 98 whose other terminal is connected to the ground 99. The base 1 B1 is also connected to condenser 100 whose other terminal is connected to the base of transistor 101. The emitter 102 of transistor 101 is connected to the ground 99 and its collector, through resistor 103, is connected to a terminal 93. A line 104, connected to the resistor 94, Zener diode 96, and condenser 97, is also connected to resistor 105 whose opposite terminal is connected to the collector of transistor 106. The emitter of transistor 106 is connected to a resistor 107 and a condenser 108, in parallel, with the opposite terminal of the resistor connected to the output terminal 108. The collector of transistor 106 is also connected, through a resistor 109 and a condenser 110, in parallel, to the base of transistor 111. The emitter of transistor 111 is connected to the ground 99 and its collector is connected to the output 108 and, through resistor 112, is connected to the line 104. The output terminal 108 is connected to a diode 113 which is in series with a condenser 114, which in turn is in series with a second diode 115, with the opposite terminal of diode 115 being connected to line 104. A resistor 116 is connected to diodes 113, 115, and to line 104.

Figure 4:
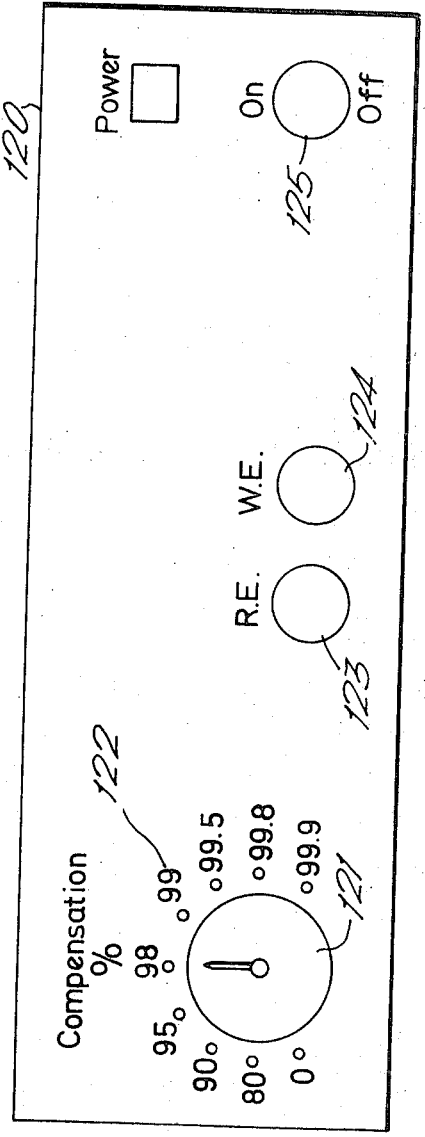
FIG. 4 is a front plan view of the panel of the case of the circuit of FIG. 1.

The front panel 120 of the case enclosing the compensation circuit is shown in FIG. 4. The panel includes a dial 121, having indicia 112 about it. The dial 121 enables the user to elect the amount, in percentage, of compensation. A connector 123 is provided for a line to the referenec electrode 11 and a connector 124 is provided for a line to the working electrode 12. A connector 125 is also provided for the power supply, which power supply is external and furnishes power to the instrument at the selected voltages, for example, +15 volts and −15 volts, and a ground connection. The rear of the panel (not shown) has a line cord and two connectors—one for the polarograph input voltage-current and the other for the polarograph output voltage-current.

Figure 5:
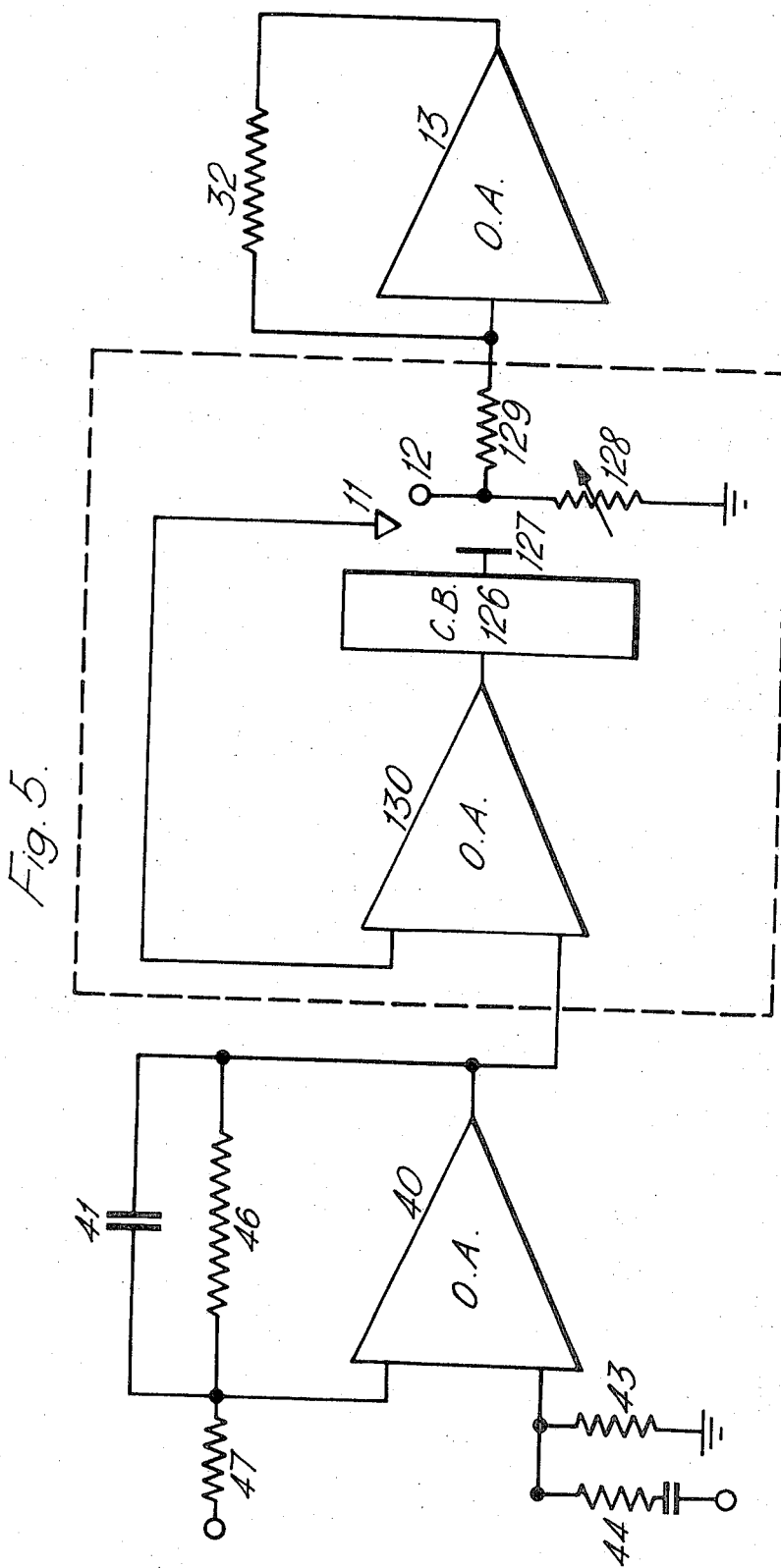
FIG. 5 is a circuit diagram of the current boost components for converting a two-electrode analytical system into a three-electrode preparative system.
Figure 1:
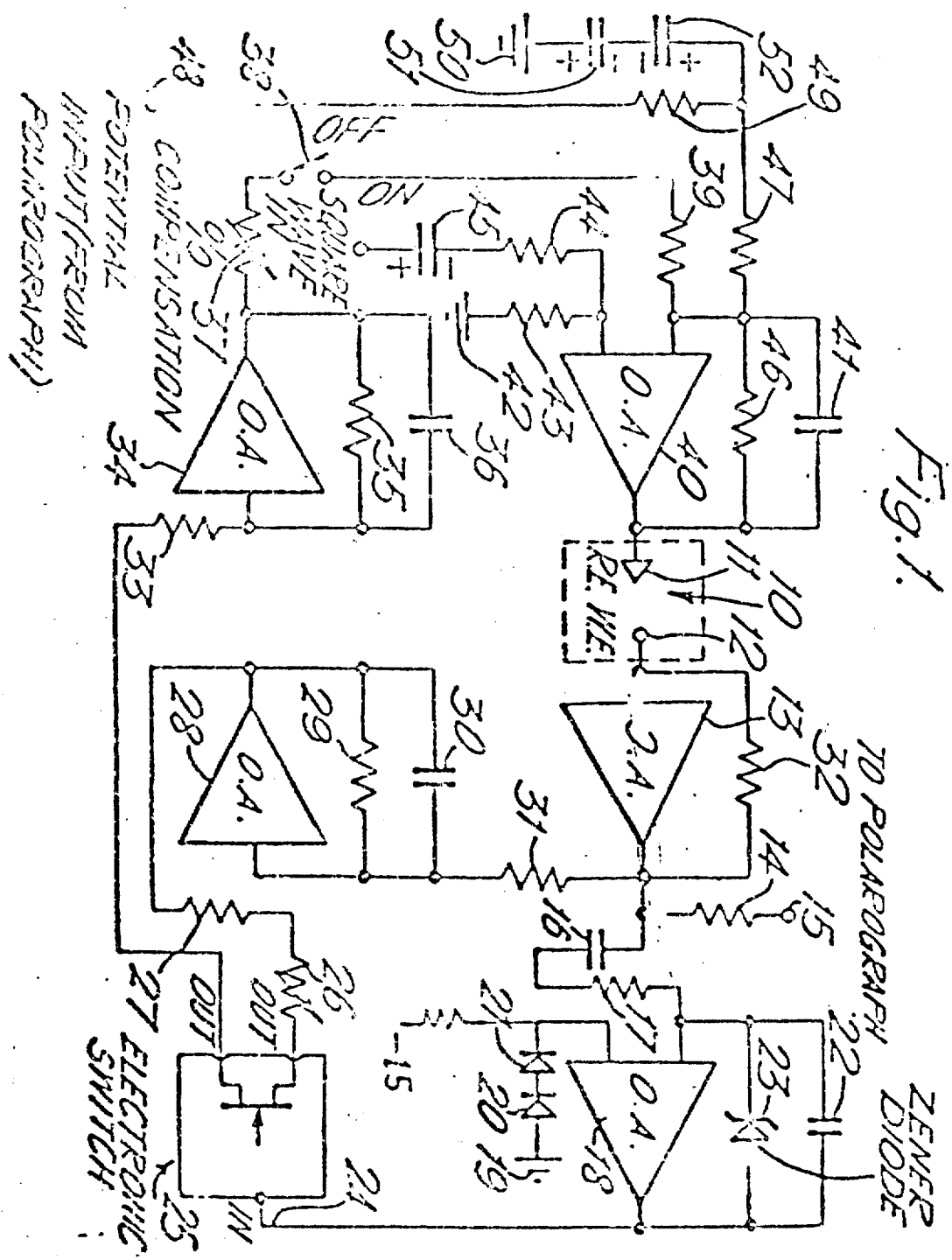

For the conversion of the analytical instrument described above to a three-electrode preparative tool, a third or counter-electrode 127 (FIG. 5) is provided. In order to provide for sufficient power, or working current to counter-electrode 127, a current boost device comprised of operational amplifier 130 and current booster 126 is provided. The output of operational amplifier 40 is fed into the positive input of operational amplifier 130, and the negative input of the latter is connected to reference electrode 11. The output of operational amplifier 130 is fed to current booster 126 whose output is in turn fed to counter-electrode 127.

Working electrode 12 in this embodiment is connected in parallel with a variable resistor 128, through which flows most of the current of the working electrode 12. In order to control the automatic compensation network, a resistor 129 (of 100K ohms) connects the working electrode with operational amplifier 13. The size of variable resistor 128 in each situation will depend on the currents which the system is designed to handle. However, with the overall system earlier described, the voltage drop across variable resistor 128 should not exceed 3V for proper system operation.

Although preferred embodiments of the polarograph have been described, it would be well within the skill of the art to make modifications to the above, and it is intended to cover all such modifications which fall within the spirit and scope of the invention as defined in the appended claims.

I claim:

1. A system for use in electrochemical analysis and production, the system including a cell adapted to contain the chemical liquid, a reference electrode and a working electrode within the cell, a polarograph connected to the electrodes, and a circuit connected to the said electrodes for compensating for the potential drop across the cell resistance, said circuit including sensing means responsive to variations in the voltage at the working electrode and connected to the working electrode, an alternating voltage wave generator connected to the reference electrode, and control means connected to said sensing means to automatically control the effect of the alternating voltage on the reference electrode.

2. The system of claim 1 wherein the sensing means includes an integrative circuit.

3. The system of claim 1 wherein the wave generator produces square-shaped waves.

4. The system of claim 1 wherein the control means is a voltage-sensitive electronic switch.

5. The system of claim 4 wherein the output of the electronic switch is to one input of an operational amplifier whose other input is connected to the wave generator.

6. The system of claim 1 further comprising a counter-electrode placed within the cell, and a current boost device connected to said counter-electrode for supplying a working current to said cell.

7. The system of claim 6 wherein said current boost device includes an operational amplifier and a current booster, said operational amplifier having negative and positive inputs and an output, said negative input being connected to the said reference electrode and said positive input being connected to said compensating circuit, said output being connected to said current booster and said current booster being connected to said counter-electrode.

8. The system of claim 6 further comprising a variable resistor connected in parallel with said working electrode.

9. The system of claim 1 further comprising a counter-electrode placed within the cell, said compensating circuit further including a current booster connected to said counter-electrode.

10. A system for electrochemical polarography consisting of a cell adapted to contain liquid, a reference electrode and a working electrode within the cell and adapted to be connected to a polarograph, and a compensating circuit including means to produce an alternating voltage of time $t$ and an electronic switch whose closure time is $\Delta t$, wherein the resistance of the circuit during compensation including the resistance of the cell will be $R_s t/\Delta t$ where $R_s$ is the resistance of the circuit.

11. A system as in claim 10 wherein the closure time of the electronic switch is voltage-sensitive.

12. A system for the electrochemical preparation of chemical substances comprising a cell adapted to contain liquid, a reference electrode, a working electrode and a counter-electrode, all three of which are mounted in said cell and adapted for connection to a polarograph, and an automatic voltage drop compensating circuit, said circuit being connected to each of the electrodes and including an alternating voltage wave generator for supplying an alternating voltage to one of said reference and working electrodes, sensing means connected to the other of said reference and working electrodes, control means connected to said sensing means to control the effect of the alternating voltage on the electrode to which the alternating voltage is supplied, and current boost means connected to the counter-electrode.

References Cited

UNITED STATES PATENTS

| | | | |
|---|---|---|---|
| 3,607,673 | 9/1971 | Seyl | 204—195 C |
| 2,246,981 | 6/1941 | Matheson et al. | 204—195 H |
| 3,406,101 | 10/1968 | Kilpatrick | 204—1 T |
| 2,962,432 | 11/1960 | Tyler | 204—195 H |

OTHER REFERENCES

Kolthoff et al., "Polarography," 2d ed., 1952, p. 374 and 375.

TA-HSUNG TUNG, Primary Examiner

U.S. Cl. X.R.

204—1 T

UNITED STATES PATENT OFFICE
CERTIFICATE OF CORRECTION

Patent No. 3,838,032   Dated September 24, 1974

Inventor(s) Chaim N. Yarnitzky

It is certified that error appears in the above-identified patent and that said Letters Patent are hereby corrected as shown below:

The name of the inventor as it appears on the drawings and in the title on the first page is corrected to read:

-- CHAIM N. YARNITZKY --.

Signed and Sealed this thirtieth Day of December 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

PATENT NO. : 3,838,032
DATED : September 24, 1974
INVENTOR(S) : Chaim M. Yarnitzky It is certified that error appears in the above-identified patent and that said Letters Patent are hereby corrected as shown below:

The voltage source just below capacitor 16 in Figure 1 of the drawings should be somewhat to the right of that point as indicated in the attached copy of the drawing.

Signed and Sealed this

Ninth Day of November 1976

[SEAL]

Attest:

RUTH C. MASON
Attesting Officer

C. MARSHALL DANN
Commissioner of Patents and Trademarks